(12) United States Patent
Marioni

(10) Patent No.: US 11,165,321 B2
(45) Date of Patent: Nov. 2, 2021

(54) ENHANCED MOTOR ASSEMBLY FOR CLOTHES DRYER MACHINE AND CLOTHES DRYER MACHINE COMPRISING SAID ASSEMBLY

(71) Applicant: Askoll Holding S.r.l., Povolaro di Dueville (IT)

(72) Inventor: Elio Marioni, Dueville (IT)

(73) Assignee: Askoll Holding S.r.l. a socio unico, Povolaro di Dueville (IT)

( * ) Notice: Subject to any disclaimer, the term of this patent is extended or adjusted under 35 U.S.C. 154(b) by 166 days.

(21) Appl. No.: 16/406,586

(22) Filed: May 8, 2019

(65) Prior Publication Data

US 2020/0181829 A1    Jun. 11, 2020

(30) Foreign Application Priority Data

Dec. 5, 2018 (EP) ..................................... 18425094

(51) Int. Cl.
 *H02K 16/00* (2006.01)
 *D06F 58/08* (2006.01)
 (Continued)

(52) U.S. Cl.
 CPC ............. *H02K 16/00* (2013.01); *D06F 58/08* (2013.01); *H02K 1/2786* (2013.01);
 (Continued)

(58) Field of Classification Search
 CPC .......... D06F 58/10; D06F 58/08; D06F 58/30; D06F 2105/46; D06F 2103/34;
 (Continued)

(56) References Cited

U.S. PATENT DOCUMENTS

| 6,745,495 B1* | 6/2004 | Riddle | .................... D06F 58/30 |
| | | | 34/497 |
| 2005/0016015 A1* | 1/2005 | Prajescu | ................. D06F 58/08 |
| | | | 34/601 |

(Continued)

FOREIGN PATENT DOCUMENTS

| CN | 1165654 C | 9/2004 |
| EP | 1696537 A1 | 8/2006 |

(Continued)

OTHER PUBLICATIONS

EPO translation of EP 2395144 (Year: 2011).*
European Search Report, dated Mar. 15, 2019, issued in connection with corresponding European Patent Application No. 18425094.

*Primary Examiner* — Naishadh N Desai
(74) *Attorney, Agent, or Firm* — Akerman LLP (57) ABSTRACT

A motor assembly for clothes dryer machine, comprising: a driving shaft rotatably associable with a frame of a clothes dryer machine and arranged to drag in rotation at least one air movement fan of said clothes dryer machine; a first electric motor comprising a first internal stator crossed by said driving shaft and rotatable relative thereto and a first outer rotor integral in rotation with said driving shaft; a second electric motor comprising in turn a second internal stator and a second outer rotor, both crossed by said driving shaft and rotatable relative thereto, wherein said second outer rotor is integral with a pulley for actuating a drum of said clothes dryer machine.

14 Claims, 8 Drawing Sheets

(51) Int. Cl.
*H02K 1/27* (2006.01)
*D06F 105/46* (2020.01)
*D06F 103/34* (2020.01)
*D06F 103/44* (2020.01)

(52) U.S. Cl.
CPC ...... *D06F 2103/34* (2020.02); *D06F 2103/44* (2020.02); *D06F 2105/46* (2020.02)

(58) Field of Classification Search
CPC ... D06F 2103/44; D06F 2103/00; H02K 1/27; H02K 16/00; H02K 7/1008; H02K 1/2786; H02K 21/22; H02K 5/15; H02K 7/14
See application file for complete search history.

(56) References Cited

U.S. PATENT DOCUMENTS

| | | | |
|---|---|---|---|
| 2005/0113216 A1* | 5/2005 | Cheng | H02K 5/225 |
| | | | 482/54 |
| 2016/0136806 A1* | 5/2016 | Caveney | B25J 9/126 |
| | | | 74/490.03 |
| 2017/0358962 A1* | 12/2017 | Morton | H02K 1/2733 |

FOREIGN PATENT DOCUMENTS

| | | | | |
|---|---|---|---|---|
| EP | 1860229 A1 * | 11/2007 | ............. | D06F 58/08 |
| EP | 1860229 A1 | 11/2007 | | |
| EP | 2395144 A2 * | 12/2011 | ........... | D06F 37/304 |
| EP | 2395144 A2 | 12/2011 | | |
| EP | 2447407 A2 | 5/2012 | | |

* cited by examiner

ENHANCED MOTOR ASSEMBLY FOR CLOTHES DRYER MACHINE AND CLOTHES DRYER MACHINE COMPRISING SAID ASSEMBLY

CROSS-REFERENCE TO RELATED APPLICATIONS

The present application claims priority to European Patent Application No. 18425094.2, filed Dec. 5, 2018, the entirety of which is incorporated herein by reference.

FIELD OF APPLICATION

The present invention, in its more general aspect, relates to a motor assembly which allows the operation of a clothes dryer machine.

Therefore, the technical field of the invention relates to clothes dryer machines. It should be noted that the generic term "clothes dryer machine" used in the present description is intended to also include machines which, in addition to the drying function, also integrates a washing function of the laundry.

PRIOR ART

Clothes dryer machines of the various kind and type are used both in the domestic and industrial areas to remove moisture from garments and/or other textile products, usually following a washing cycle performed thereon.

Said clothes dryer machines have a rotating drum intended to house the laundry to be dried. The machine further comprises at least one hot-air ventilation system introduced in the drum with a drying function. In some types of condensing clothes dryer machines, a second cold-air ventilation system is also provided, which is intended, through a heat exchanger, to dehumidify the drying air for a subsequent recirculation in the rotating drum.

The above described machines thus comprise two or three motorized components: the rotating drum and one or two air-movement fans.

Traditionally, in compliance with a criterion of economy and simplicity of construction, a single electric motor for the motorization of all the above components has been used.

In particular, the fan or the two fans are keyed on a driving shaft, which the rotating drum is also connected to by means of a belt transmission. The driving shaft is integral with the rotor of an electric motor, the latter being supported in a tilting manner by the frame of the clothes dryer machine.

Said constructive configuration, actually used in most machines available on the market, rigidly constrains the speed of the fan to that of the drum. Said compromise is traditionally accepted in favour of the constructive economy of the assembly.

However, the current optimization needs, driven by the developments in the regulations on the energy classification of household appliances, have made the above speed constraint critical.

Ideally, it would in fact be preferable to be capable of varying the speed of the ventilation fan based on the phases of the drying cycle and totally independently with respect to the revolutions of the drum.

Moreover and especially, the speed constraint forces to non-optimal design choices, thus preventing the adoption of fans of large dimensions with a limited number of revolutions per minute, which would allow to develop a high torque by moving large volumes of air.

By the way, the use of a separate motor for the ventilation fan forces to a complete re-design of the entire clothes dryer machine, inside which the housings are specifically designed for the dimensions of the traditional system. Said re-design is economically onerous and furthermore raises potential compatibility problems with the spare parts available on the market.

The technical problem underlying the present invention is therefore to conceive a motor assembly which allows solving the above described drawbacks of the prior art, and in particular which allows improving the energy effectiveness of the clothes dryer machine without resort to a re-design of the entire appliance.

SUMMARY OF THE INVENTION

The above identified technical problem is solved by a motor assembly for a clothes dryer machine, comprising: a driving shaft, which is rotatably associable with a frame of a clothes dryer machine and arranged to drag in rotation at least one air movement fan of said clothes dryer machine; a first electric motor comprising a first internal stator crossed by said driving shaft and rotating relative thereto and a first outer rotor which is integral in rotation with said driving shaft; a second electric motor comprising in turn a second internal stator and a second outer rotor, both crossed by said driving shaft and rotating relative thereto, wherein said second outer rotor is integral with a pulley for actuating a drum of said clothes dryer machine.

The above suggested external rotor architecture allows the integration of the assembly, equipped with a separate motorization for the fan and the drum, within the traditional dimensions of a motor assembly for a clothes dryer machine. The motor assembly may thus be housed within the volumes of the existing clothes dryer machine models, namely it allows making new models with enhanced energy performance without requiring a complete re-design of the previous machines.

It is noted that one or more air movement fans may be coupled to the driving shaft, according to the specific needs connected to the type of operation of the domestic appliance whereon the motor assembly is mounted. Furthermore, the fan may be directly keyed on the driving shaft or constrained thereto by means of a kinematic transmission of any type. The motor assembly may comprise a main body, which the first internal stator and the second internal stator are integral with. Said main body may be mounted tilting with respect to the frame of the clothes dryer machine, analogously to the single electric motor of the clothes dryer machines known in the art.

Preferably, the driving shaft will be rotatably supported by the frame of the machine, for instance by means of bearings; the main body is in turn rotatably supported by the driving shaft. The latter is constrained in a tilting manner to the frame by means of a connection spring contrasted by the torque of a transmission belt wound around an idler pulley which is integral with the main body itself.

Preferably, the first internal stator and the second internal stator face two opposite ends of said main body, said first outer rotor and said second outer rotor being cup-shaped and closing said ends.

The main body, along with the rotors, may therefore define a housing casing for one or more connection and/or control boards of the first and of the second electric motor.

In the present text, "connection board" indicates a board having a mere function of electric connection and without a control function.

In particular, the motor assembly may comprise a unique control board for both the first electric motor and the second electric motor. In this case, a single power input and a single signal input for both motors are provided, preferably in the form of snap connectors defined externally to the housing casing.

Alternatively to what has been stated above, the control of the two electric motors may be carried out by a unit external to the motor assembly; in this case, the motor assembly comprises a first connection board and a second connection board, which are dedicated to the first electric motor and to the second electric motor, respectively.

As previously mentioned, the motor assembly preferably comprises an idler pulley, which is rotatably mounted on a pin that is integral with said main body. The idler pulley is arranged axially in line with said pulley along a longitudinal axis of said driving shaft.

The pin is preferably mounted parallel to the longitudinal axis on an eccentric portion of the main body, said eccentric portion also providing an attachment for a connection spring to the frame of the clothes dryer machine. Preferably, the eccentric portion protrudes with respect to the cylindrical peripheral wall hereinafter defined.

The main body may advantageously comprise a sleeve—preferably coupled to the driving shaft by means of at least two interposed ball bearings—rotatably coupled above the driving shaft, said first internal stator and said second internal stator being both supported by said sleeve.

The aforementioned housing casing of the boards may advantageously be defined by a peripheral wall, preferably cylindrical, connected to the sleeve by a central baffle which is orthogonal to the longitudinal axis of the driving shaft.

The orthogonal central baffle may act as support to the connection and/or control boards of the motors.

The motors are preferably permanent-magnet synchronous motors, for instance of the three-phase type with star package.

Thus, said first outer rotor and said second outer rotor may both comprise an annular permanent magnet, associated with an internal wall of a rotating cup. The magnet may in particular be a plastoferrite ring housed inside a metal ring which is necessary for closing the flow thereof, these two components being co-molded with the plastic cup to make the aforementioned rotor.

Said first internal stator and said second internal stator may both comprise a pack of laminations made of ferromagnetic material, said pack of laminations having an annular core from which a plurality of arms departs out, said arms being covered by spools, on said spools being disposed electric windings.

Preferably, the second outer rotor and the pulley are made in a single piece, said piece being rotatably mounted above said driving shaft with the interposition of at least one bearing—preferably at least two.

The previously identified technical problem is also solved by a clothes dryer machine comprising: a rotating drum, which is rotatably mounted with respect to a frame and is intended to house laundry to be dried; and at least one air movement fan, said clothes dryer machine comprising a motor assembly of the previously described type.

Further features and advantages of the present invention will be clearer from the following description of two preferred embodiments given by way of non-limiting example with reference to the enclosed drawings.

DETAILED DESCRIPTION

With reference to the enclosed FIGS. 1-5, a first embodiment of a motor assembly of a clothes dryer machine 1001 is generically indicated by reference number 1.

Figure 1:
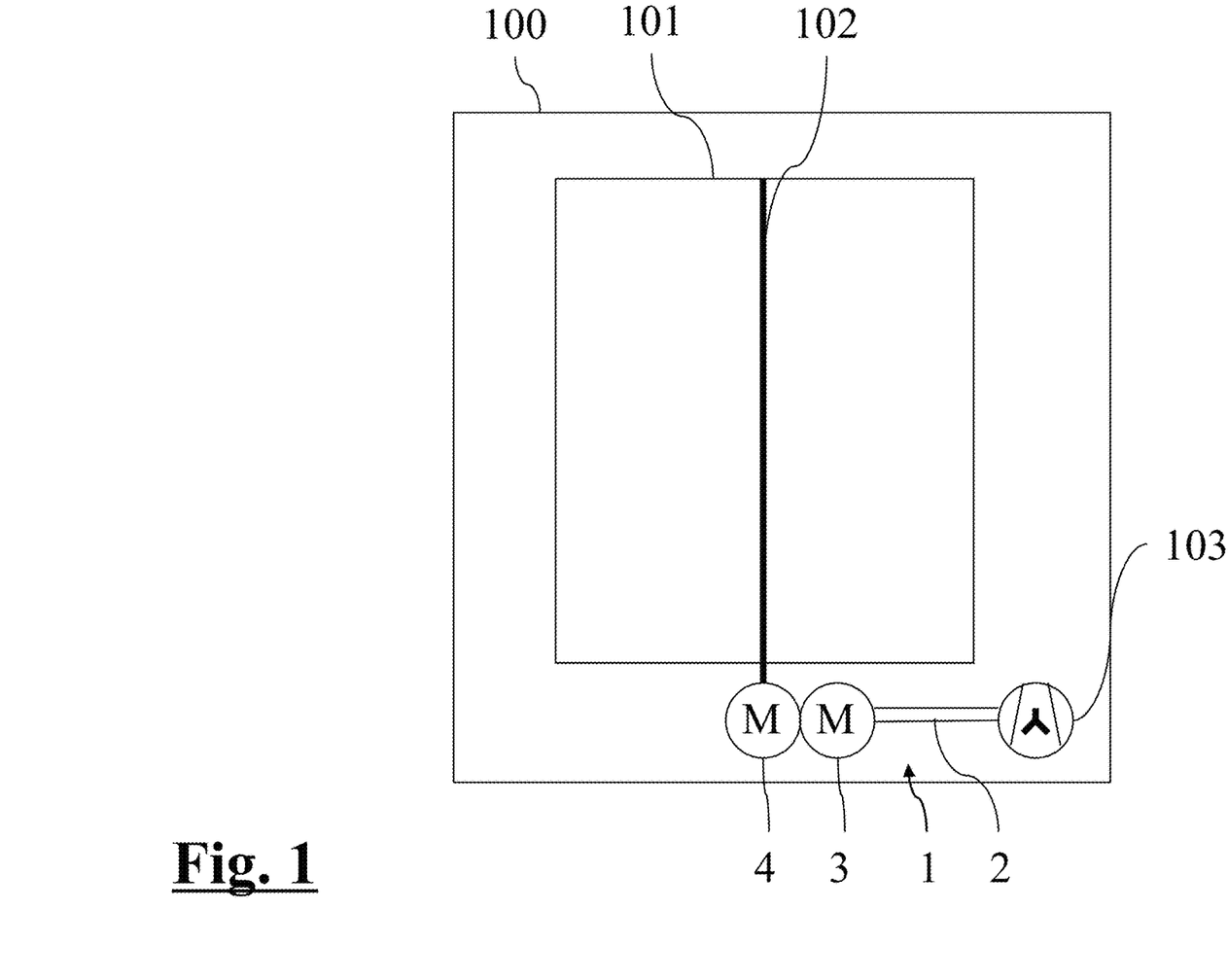
FIG. 1 schematically shows a clothes dryer machine according to the present invention.
Figure 2:
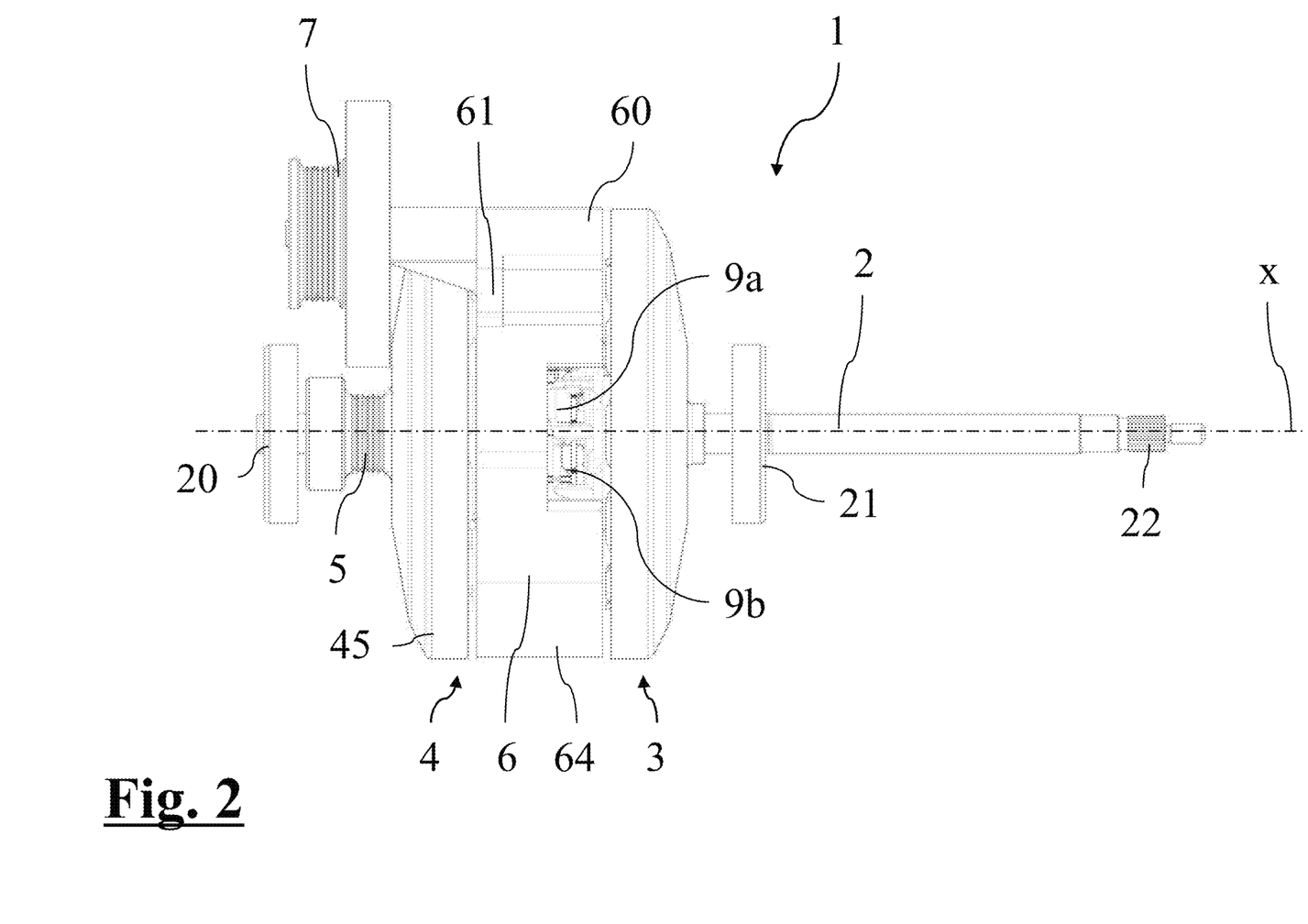
FIG. 2 shows a side view of a motor assembly according to a first embodiment of the present invention.
Figure 3:
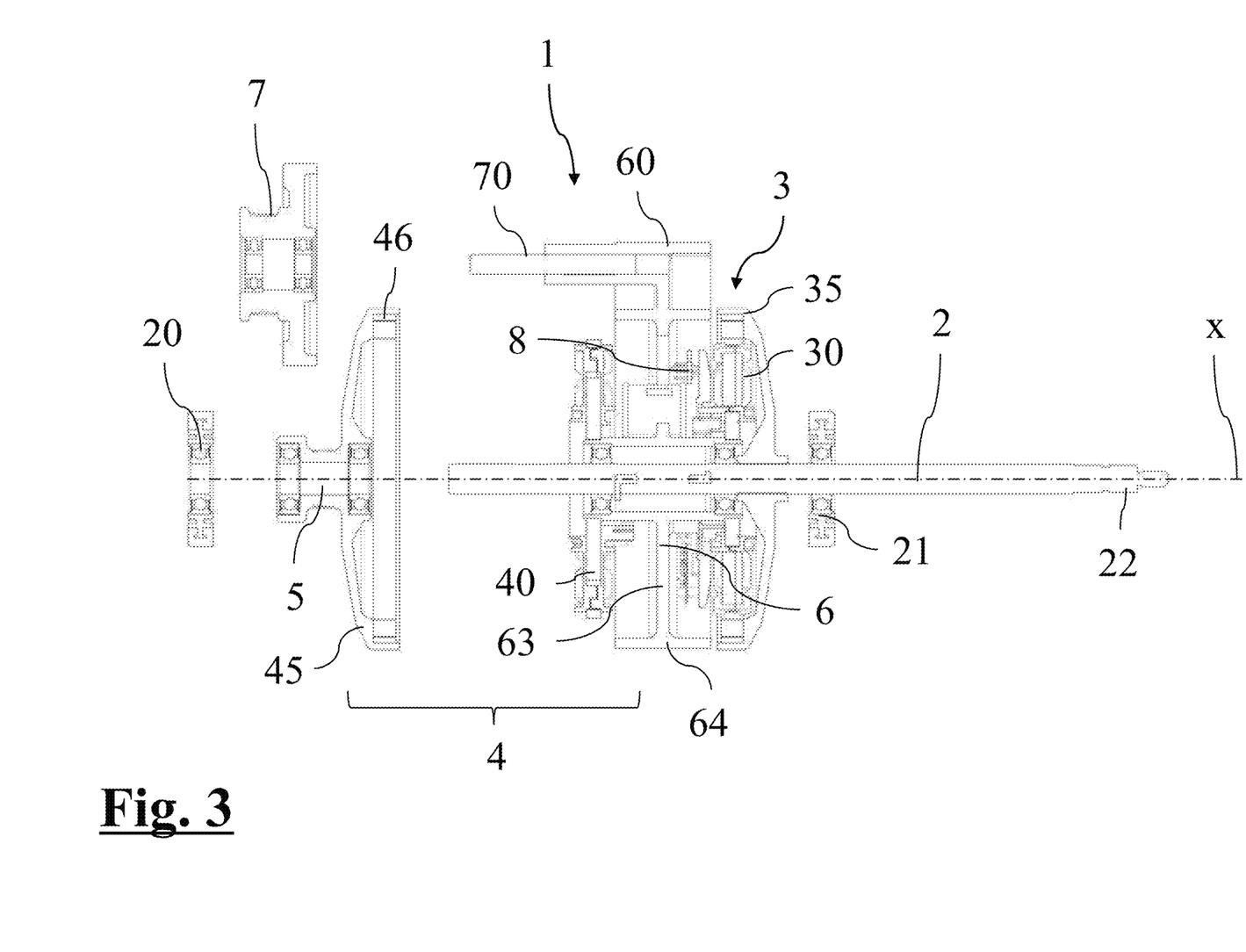
FIG. 3 shows a partially exploded cross-sectional view of the motor assembly of FIG. 2.
Figure 4:
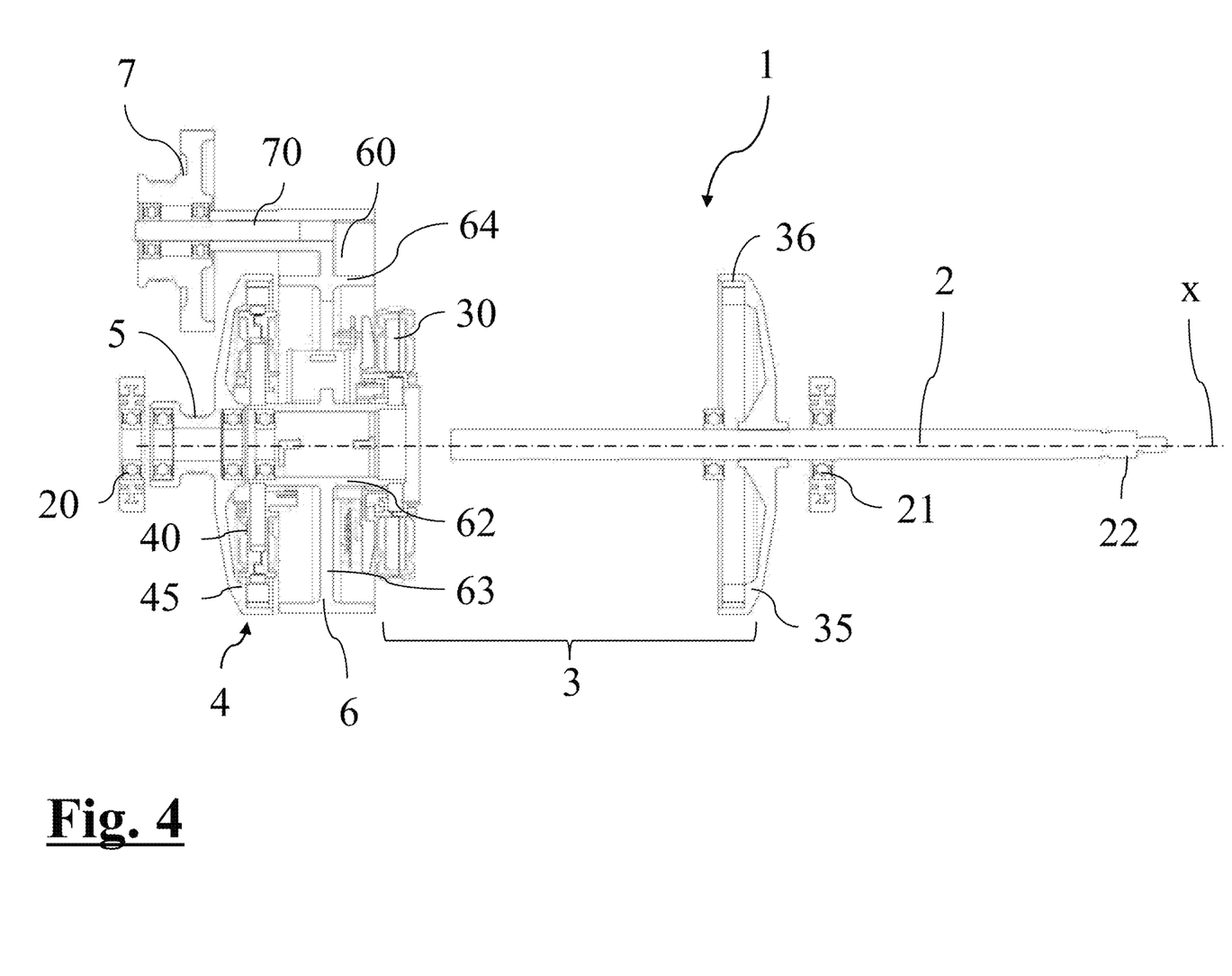
FIG. 4 shows a partially exploded cross-sectional view of the motor assembly of FIG. 2.
Figure 5:
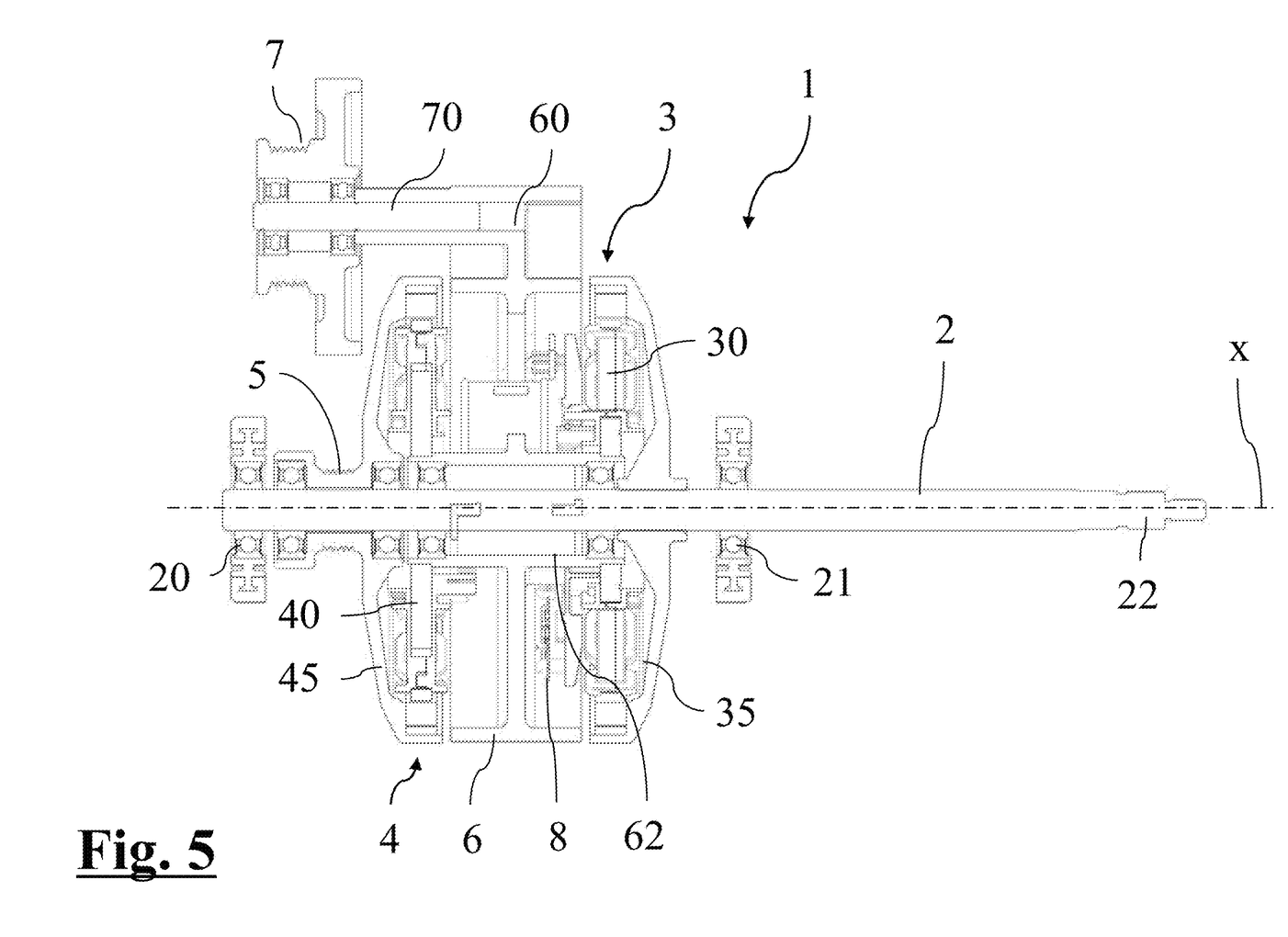
FIG. 5 shows a cross-sectional view of the motor assembly FIG. 2.

The clothes dryer machine 100 as a whole is schematically represented in FIG. 1.

Inside the machine at least one air path intercepted by an air movement fan 103 is defined, which is keyed on a driving shaft 2 dragged in rotation by a first electric motor 3.

The clothes dryer machine 100 further comprises a rotating drum 101, which is rotatably mounted with respect to a frame of the machine and which is intended to house a load of laundry to be dried. Said rotating drum is connected to a second electric motor 4 by means of a transmission belt 102.

Thus, the motor assembly 1 comprises a driving shaft 2 having longitudinal axis x. It is rotatably associated with the frame of the clothes dryer machine 100 by means of two ball bearings 20, 21, which are surrounded by a rubber antivibration ring, are arranged at a first end and in an intermediate portion of the shaft itself. At the second end, the bearing has serrations 22 for keying the air movement fan 103.

Between the two ball bearings 20, 21 both the first electric motor 3 and the second electric motor 4 are arranged.

The two electric motors 3, 4 are preferably permanent-magnet synchronous electric motors of three-phase type.

Both of them have an internal stator, a first internal stator 30 and a second internal stator 40, respectively, and an outer rotor, a first outer rotor 35 and a second outer rotor 45, respectively.

The internal stator 30, 40 of both electric motors 3, 4 is of the star-pack type, that is, it comprises a pack of laminations made of ferromagnetic material having an annular core from which twelve square-section arms 31, 41 depart out, which define the stator magnetic poles. The arms 31, 41 of the annular core are inserted inside spools, on which the electric windings of the stator are arranged in a per se known manner.

The outer rotor 35, 45 of both electric motors 3, 4 comprises a containment cup surrounding the outer periphery of the inner stator 30, 40. The axial portion of the containment cup has a cylindrical internal surface, which supports an annular permanent magnet 36, 46. The magnet faces the polar expansions of the respective internal stator 30, 40 and is divided therefrom by an air gap of suitable amplitude.

It should be noted that, even if in the present embodiments the two electric motors 3, 4 are represented with identical size and power, they may have different power and size according to the specific project needs. The internal stators 30, 40 of the two electric motors 3, 4 are supported by a same main body 6, which is rotatably mounted above a portion of the driving shaft 2 that is intermediate to the two aforementioned ball bearings 20, 21.

The portion of the main body 6 which supports the two internal stators 30, 40 at its two ends is a sleeve 62, which is in turn supported by the driving shaft 2 having interposed ball bearings.

From the sleeve 62 a central baffle 63, which connects it to a cylindrical peripheral wall 64, coaxial to the sleeve 62 itself, develops radially. The cylindric peripheral wall 64 is covered, at its opposite ends, by the cup of the outer rotors 35, 45.

Thus, a containment casing is defined, which encloses, in addition to the two internal stators 30, 40, a control board 8 attached to the central baffle 63, in the present application example on the side of the first electric motor 3.

The control board 8, arranged to serve both electric motors 3, 4, is connected to a power input 9a and to a signal input 9b which open on the peripheral wall 64.

The central body 6 also comprises an eccentric portion 60, which protrudes laterally with respect to the peripheral wall 64. This portion supports a fixed pin 70, whereon an idler pulley 7 is mounted idle by interposition of two ball bearings.

Still on the eccentric portion 60 an attachment 61 for a connection spring to the frame of the clothes dryer machine 100 is provided, to allow a floating connection mode which is traditionally used to constrain the actuating electric motors in the prior art machines.

The first outer rotor 35 is directly keyed on the driving shaft 2, so that the rotation of the first electric motor 3 drags in rotation the fan keyed on the serrations 22.

Instead the second outer rotor 45 is rotatably mounted on the driving shaft 2 by means of ball bearings. It has a tubular appendix away from the second internal stator 30, namely protruding with respect to the convex part of the rotor cup. The tubular appendix defines a pulley 5 and has a plurality of transmission throats whereon the transmission belt 102 to the rotating drum 101 wounds.

With reference to the enclosed FIGS. 5-8, a second embodiment of a motor assembly of a clothes dryer machine 100 is generically indicated with reference number 1'.

Figure 6:
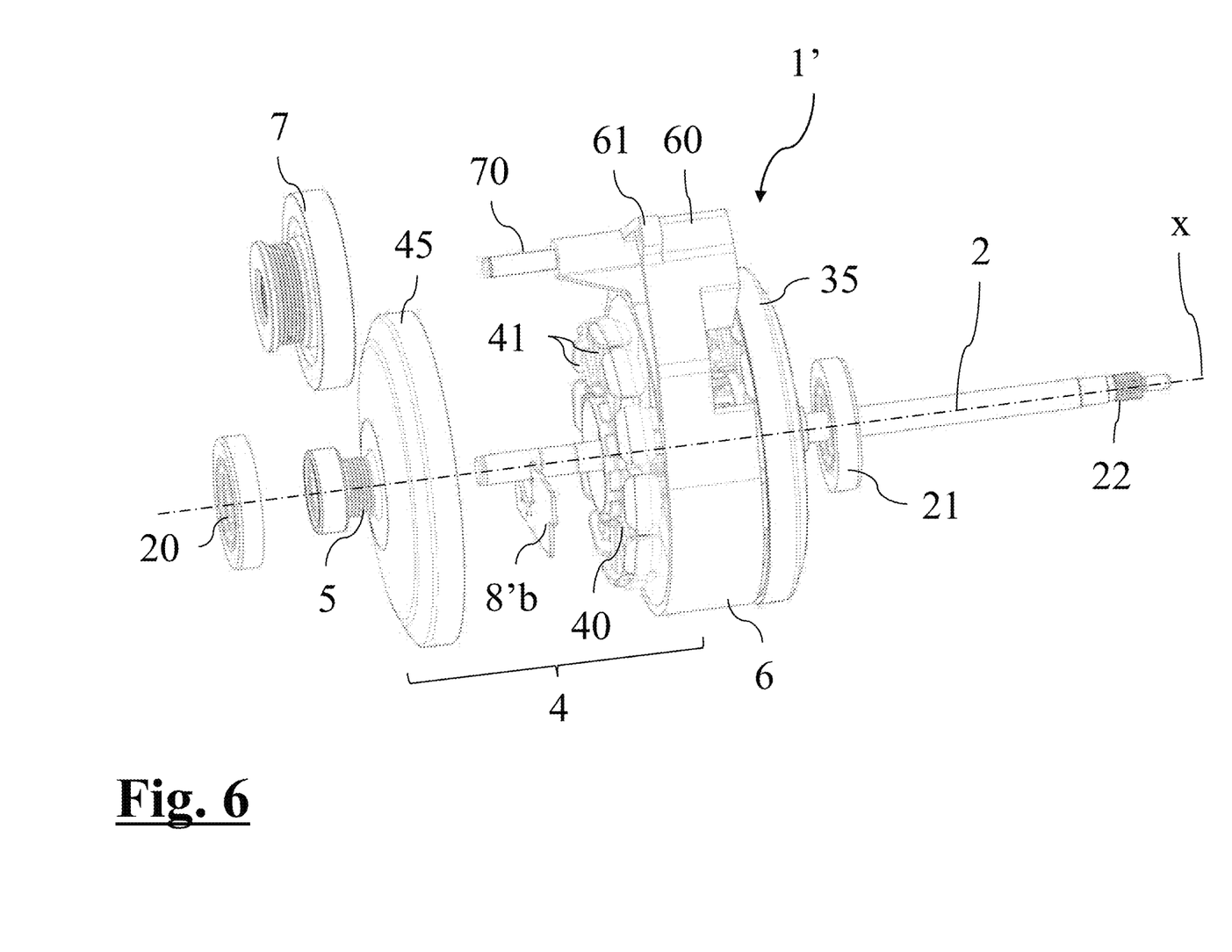
FIG. 6 shows a perspective view of a motor assembly according to a second embodiment of the present invention.
Figure 7:
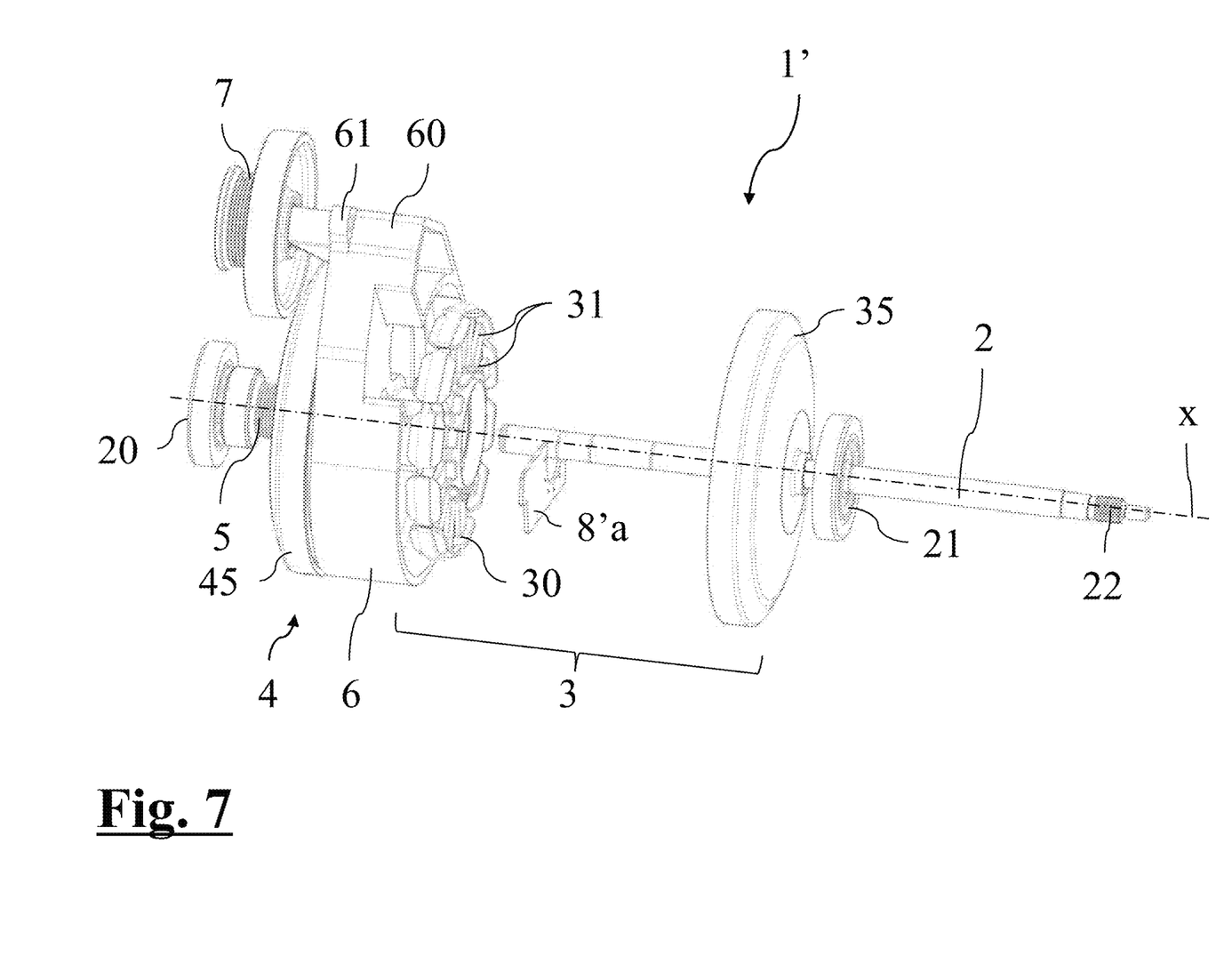
FIG. 7 shows a partially exploded perspective view of the motor assembly of FIG. 6.
Figure 8:
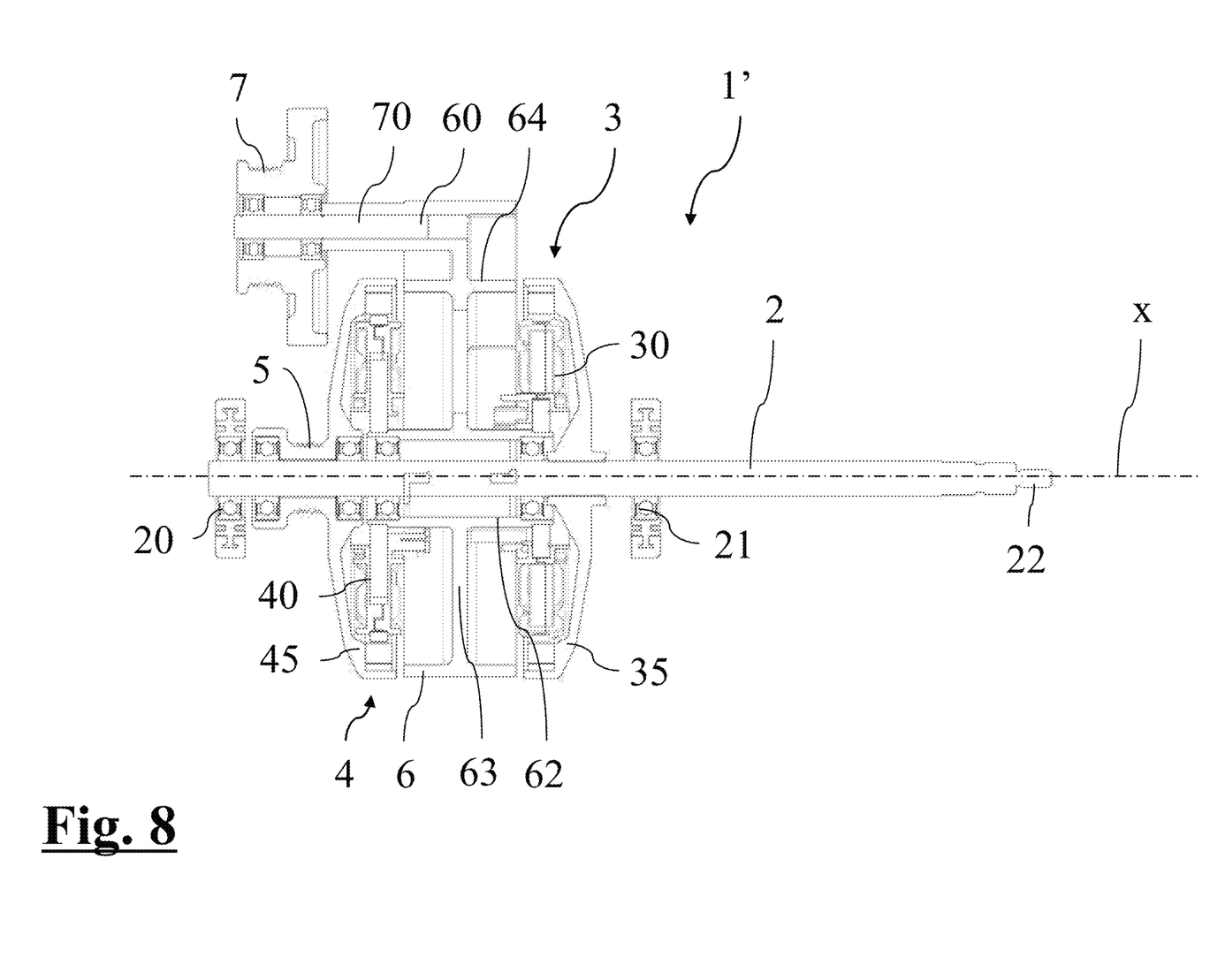
FIG. 8 shows a cross-sectional view of the motor assembly of FIG. 6.

Said embodiment is substantially identical to the previous one, to the description of which reference is made, except for the control mode of the two electric motors 3, 4, which occurs remotely and not onboard a card integrated in the unit.

Therefore, in this case, the control board 8 is missing and replaced by two small connection boards 8'a, 8'b, each of which is intended to receive the power supply directed to the windings.

The connection boards 8'a, 8'b are arranged on the two sides of the central baffle 63, from the side of the electric motor 3, 4 thereto interlocked.

Obviously, a skilled person can make several changes and variants to the above described mechanical assembly and the appliance, in order to meet contingent and specific needs, all of them by the way contained in the scope of protection of the invention as defined by the following claims.

The invention claimed is:

1. A motor assembly for a clothes dryer machine, comprising:
  a driving shaft which is associable in a rotating manner with a frame of a clothes dryer machine and arranged to drag in rotation an air movement fan of said clothes dryer machine;
  a first electric motor comprising a first internal stator crossed by said driving shaft and rotating relative thereto and a first outer rotor integral in rotation with said driving shaft;
  wherein said motor assembly also comprises a second electric motor comprising in turn a second internal stator and a second outer rotor, both crossed by said driving shaft and rotating relative thereto, wherein said second outer rotor is integral with a pulley for actuating a drum of said clothes dryer machine,
  wherein said motor assembly further comprises a main body, wherein the first internal stator and the second internal stator are both integral with said main body, said main body being arranged to be mounted tilting with respect to the frame of said clothes dryer machine.

2. The motor assembly according to claim 1, wherein said first internal stator and said second internal stator face two opposite ends of said main body, said first outer rotor and said second outer rotor being cup-shaped and closing said two opposite ends of the main body.

3. The motor assembly according to claim 1, further comprising an idler pulley rotatably mounted on a pin integral with said main body, said idler pulley being arranged axially in line with said pulley along a longitudinal axis of said driving shaft.

4. The motor assembly according to claim 3, wherein said pin is mounted parallel to the longitudinal axis on an eccentric portion of said main body, said eccentric portion also providing an attachment for a connection spring to the frame of the clothes dryer machine.

5. The motor assembly according to claim 1, wherein said main body comprises a sleeve rotatably coupled above the driving shaft, said first internal stator and said second internal stator being both supported by said sleeve.

6. The motor assembly according to claim 5, wherein said sleeve is rotatably coupled to said driving shaft by means of at least two interposed ball bearings.

7. The motor assembly according to claim 5, wherein said main body defines a housing casing for one or more connection and/or control boards of the first and of the second electric motor.

8. The motor assembly according to claim 7, wherein said housing casing is defined by a peripheral wall connected to the sleeve by a central baffle which is orthogonal to the longitudinal axis of the driving shaft.

9. The motor assembly according to claim 1, wherein said first outer rotor and said second outer rotor both comprise an annual permanent magnet.

10. The motor assembly according to claim 1, wherein said first internal stator and said second internal stator both comprise a pack of laminations made of ferromagnetic material, said pack of laminations having an annular core from which a plurality of arms departs out, said arms being covered by spools, on said spools electric windings being disposed.

11. The motor assembly according to claim 1, wherein the second outer rotor and the pulley are made as a single piece, said piece being rotatably mounted above said driving shaft with the interposition of at least one bearing.

12. The motor assembly according to claim 1 comprising a single power input, a single signal input and a single control board for both the first electric motor and the second electric motor.

13. The motor assembly according to claim 1, wherein the control of the first electric motor and of the second electric motor is performed by a unit external to the motor assembly, said motor assembly comprising a first connection board and a second connection board which are dedicated to the first and to the second electric motor, respectively.

14. A clothes dryer machine comprising: a rotating drum, rotatably mounted with respect to a frame and intended to house laundry to be dried; and at least one air movement fan, said clothes dryer machine comprising a motor assembly according to claim 1.

* * * * *